Sept. 12, 1939.　　　P. F. K. ERBGUTH　　　2,173,061
DAMPED CHART-PEN LIFTER
Filed Oct. 16, 1937
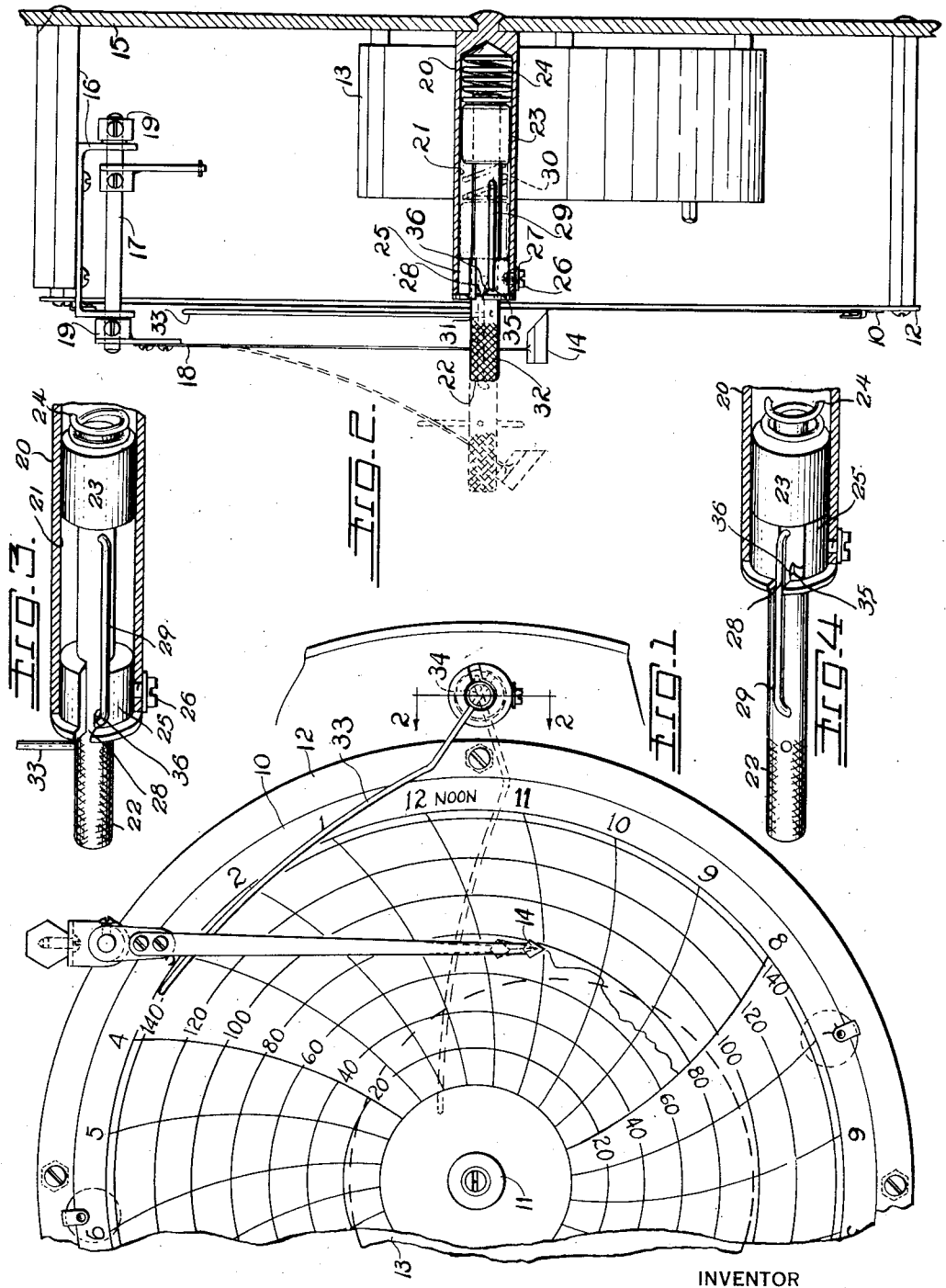
WITNESS
Ed S. Smith, Jr.
INVENTOR
Paul F. K. Erbguth
BY
ATTORNEYS Patented Sept. 12, 1939

2,173,061

UNITED STATES PATENT OFFICE 2,173,061

DAMPED CHART-PEN LIFTER

Paul F. K. Erbguth, Brooklyn, N. Y., assignor to Charles J. Tagliabue Mfg. Co., Brooklyn, N. Y., a corporation of New York Application October 16, 1937, Serial No. 169,386

7 Claims. (Cl. 234—70)

The present invention relates to a combined pen lifter and chart top retainer for a disc chart driven by a time shaft. It particularly relates to a new type of pen lifter having means to slowly and positively lift the pen from the chart so as not to throw ink from the pen.

Primary objects of the invention are to provide an improved pen lifter, for the disc chart, which may be rendered operative by the manual turning, preferably a single twist of the pen lifter, and which automatically and infallibly works smoothly to give better chart records than were heretofore obtainable.

A related object is to so adapt and arrange a portion of the pen lifter that it serves not only as a pen lifter in its operative position but also as a retainer for the top of the chart in its inoperative retracted position; the outer end of another portion being so disposed as to be readily accessible for manual manipulation.

Still another object of the present invention is to provide, in such a pen lifter, the combination of a spring with an air-damped piston and cylinder to give a smooth and gradual motion to the pen lifter when the latter is manually twisted to free it from a detent which normally holds it in its inoperative and chart top retaining position.

A still further object of the present invention is to so arrange the several means that the changing of charts without interference with the record is greatly facilitated, a matter of utmost importance in the practical use of the recording instrument, and especially in the process industries which require enormous numbers of such industrial tools for economic process control.

Still another object of the present invention is the provision of a compact, inexpensive and efficient pen lifting device which is both attractive in appearance and also convenient for use by even an unskilled operator. These and other objects of my invention will appear to those skilled in the art from the accompanying drawing and specification, in which are illustrated and described a specific embodiment of the invention, it being my intention to claim all that I have disclosed which is new and useful.

In the drawing, wherein like characters indicate like parts throughout: Fig. 1 is a front elevation of my device shown installed in a conventional recording instrument only part of which is drawn, the remainder being broken away; Fig. 2 is a broken side elevation thereof, partially in section, such section being taken on the line 2—2 of Fig. 1, the scale of Fig. 2 being the same as Fig. 1. In both figures, the pen lifter is shown by dotted lines in its operative extended position and by solid lines in its normally inoperative retracted position. It will be understood that the chart hub is driven by a clock motor to rotate a disc chart relative to a marking pen therefor, all in conventional manner, and that the specific form shown is simply for illustrative and descriptive purposes and without attempt to restrict the field of applicability to the pen lifter shown. Figs. 3 and 4 are perspective diagrams, generally from the side, and respectively show the pen lifter in its normal and operative positions which respectively correspond with those shown by solid and dotted lines in Fig. 2.

Referring to the drawing, chart 10 is removably secured to chart hub 11 so as to be rotated between chart plate 12 and pen 14 by clock motor 13, e. g. once every 24 hours. Both chart plate 12 and clock 13 are mounted on frame 15 of the recording instrument, as is also mounting bracket 16 in which shaft 17 for pen arm 18, is rotatably mounted while restrained against substantial axial movement, as by spacing collars 19.

Cylinder 20 for damping the pen lifter is shown riveted to frame 15 and has a smoothly finished interior cylindrical surface 21. Pen lifter shaft 22 has its piston 23 finished to be only slightly, i. e. 0.0005"–0.0015", smaller in radius than that of cylindrical surface 21. Piston 23 is disposed within cylinder 20 so that piston 23 is both axially and oscillatably movable within cylinder 20. The inner end of piston 23 is adapted to retain one end of spring 24, the other end of which abuts the closed end of cylinder 20. The free length of spring 24 is large enough so that this spring exerts a force on one end of piston 23, even when the latter is in its most extended position, considerably in excess of that necessary to overcome friction and so produce motion. In such extended position, the outer face of piston 23 abuts slotted collar 25 which is secured within cylinder 20 by screw 26 which is provided with lock washer 27. Shaft 22 is of slightly smaller diameter than that of the hole in collar 25. Collar 25 is provided with slot 28 which is enough wider for sliding clearance, at its narrowest and outermost portion, than the diameter of wire 29. This wire has its two ends bent at right angles to its length and inserted in holes 30 in portion 31 of shaft 22 to form, in effect, a longitudinal rib thereon. Wire 29 can pass through slot 28 only when shaft 22 is turned, preferably by the knurled outer end 32 of shaft 22 or by the wire 33 forming the pen lifter and chart top holder. Wire 33 is tightly driven, to be push, pull, and twistproof, into hole 34 in outer shaft portion 31. Wire 33 is spaced from the nearest portion of wire 29 by a slightly smaller distance than the width of collar 25. Wire 33 is so formed and disposed by cylinder 20 as to be parallel with chart plate 12 at a slight distance therefrom so as to hold the top of the chart, with which the arcuate portion of wire 33 is roughly parallel, in the normally inoperative position of wire 33 as regards pen lifting. The inner end of wire 29 is located a spaced distance from piston 23 of less than the total thickness of collar 25. The arrangement is such that, with the pen lifter in its extended position, wire 29 is held by the narrowest part of slot 28 so that wire 33 is in a suitable pen-engaging position; and also so that, with the pen holder in its retracted position, shaft 22 may be turned so that the outer end of wire-rib 29 abuts notch 35 in the enlargement of the slot in inner surface of collar 25 to act as a detent in one angular position of shaft 22. In this position, wire 29 is no longer in line with the narrowest and outer portion of slot 28 but is angularly removed therefrom as far as the width of the lateral enlargement of the slot portion will permit, i. e. by the angular distance between centers of slot 29 and of notch 35. Inclined wedge-surface 36 connects slot 28 with notch 35 to form an obtuse angle so that the attendant can readily turn shaft 22 to cause the outer end of wire-rib 29 to line up with the narrowest portion of slot 28, after which, spring 24 forces the pen lifter to slide slowly outwardly without further turning. The length of piston 23 materially exceeds its diameter. As aforementioned, this provides a throttling passage of a thickness for a ⅜-inch diameter piston of the order of approximately 0.001″ on the average for the passage of atmospheric air, although obviously, for other fluids than air, corresponding suitable clearances are provided. Collar 25 is of a lesser degree of hardness of metal than are shaft portions 31 and its detent and guide wire 29, to reduce wear and friction in use.

The operation of the device is as follows: with the parts in the position as shown (Figs. 1 and 2) by solid lines, wire 33 is spaced, in its normal chart retaining position, a short distance from chart plate 12. When the attendant wishes to change charts, he grasps the knurled outer end 32 of shaft 22 between thumb and forefinger, depresses it slightly and turns it slightly in a counterclockwise direction, (Fig. 1) after which he releases it. Spring 24 then forces piston 23 outwardly, the wire 29 sliding along slot 28 unless the attendant has already turned shaft 22 far enough to bring wire 29 into line with slot 28. Spring 24 continues to push piston 23 outwardly, the motion of piston 23 being no longer resisted by any portion of collar 25 but limited to the low velocity which is permitted by the passage of air between piston 23 and cylinder wall 21 into the inner end (righthand in Figs. 2-4) of this cylinder. Under all conditions of operation, the resultant motion is gradual that pen 14 is smoothly lifted from its chart 10 to leave a clean record without any splashes of ink due to jarring or any severe hunting motions of the pen resulting from the action of the pen lifter. In other words, the angular motion of the pen lifter, to bring the outer end of wire 29 clear of notch 35 over wedge 36 to slot 28, is so small relative to the axial travel of shaft 22, before wire 33 first lifts pen arm 18, that pen arm 18 is raised substantially directly away from the chart since wire 29, parallel with the axis of shaft 22 is already in its guiding slot 28 when wire 33 engages flexible pen arm 18. In practice, the axial motion of piston 23 is sufficient to elevate pen 14 approximately an inch from the chart, a distance which is more than ample for the changing of charts without interference from the pen.

The attendant then ordinarily replaces the used chart with a new chart, after which he simply presses knurled end 32 of shaft 22 down until the outer end of wire 29 clears its slot 28, and then he twists knurled portion 32 in a clockwise direction until wire 29 fetches up against the far side of notch 35 of collar 25. Upon release of knurled end 32, both spring 24 and the air compressed under piston 23 force the outer end of wire 29 firmly into notch 35 where it is subsequently retained by the force of spring 24 even after the air escapes from cylinder 20, between piston 23 and cylinder wall 21, to the atmosphere. As in lifting the pen, when again bringing it into contact with the chart, the motion of shaft 22 is substantially axial during the critical period in which the pen is leaving and the contact of pen with the chart is interrupted and restored, respectively, with the result that the record is resumed on the chart without interruption, assuming that no change of the indicated variable has occurred during the brief interval required for changing charts with the help of the improved pen lifter described above.

The pen lifter of the present invention is purposely made so that it does not lift the pen when the door is opened, because in many cases it is desirable to continue recording while the door is open to permit adjustments or for obtaining closer indications by tapping the chart.

The terms and expressions which I have employed are used as terms of description and not of limitation, and I have no intention, in the use of such terms and expressions, of excluding any equivalents of the features shown and described and portions thereof, but recognize that various modifications are possible within the scope of the invention claimed, e. g., an obvious mechanical equivalent of the damping means would be the use of any other damping in which the damping is a function of velocity.

I claim:

1. In combination, a pen lifter, means for biasing the pen lifter towards an operative pen-lifting position, detent means normally effective to hold the pen lifter inoperative, and damping means operatively connected with the pen lifter to increasingly oppose said biasing means upon an increased velocity of lifting of the pen lifter; all adapted and arranged so that the pen lifter is automatically movable from a detent-releasing position to an operative position and is manually movable from an operative to an inoperative position and from said inoperative to a detent-holding position.

2. In combination; a shaft; a pen arm lifter, and detent and guiding means affixed thereto; and a fixed guiding and detent means; said guiding means being adapted and arranged to operatively coact to guide said shaft so that it is movable substantially axially when in its extended pen-lifting position and so that said shaft is movable angularly when in its retracted position, said detent means being adapted and arranged to be operative by their relative angular movement when said shaft is in said retracted position.

3. In combination; a shaft; a pen lifter and a longitudinally disposed rib affixed to said shaft; and a fixed shaft-guiding collar having a hole only slightly larger than said shaft, a slot only slightly wider than said rib for restraining said shaft to move substantially axially while said rib is in contact with said slot when in the extended pen-lifting position, and a detent notch on one face of said collar adjacent said slot and adapted to engage an end of said rib when in its retracted position.

4. In combination; a shaft substantially normal to the plane of a chart; a wire attached to said shaft and generally radial thereto for lifting a pen from the chart; and guiding and detent means attached to said shaft and fixed guiding and detent means coacting respectively with said firstnamed guiding and detent means adapted and arranged to guide the shaft to move substantially axially when in an operative position and also angularly when in an inoperative position; said firstnamed guiding means comprising a rib-projection, and a portion of said fixed detent means being modified to coact with said projection, such coacting portion having a notch for normally retaining the pen lifter in its inoperative position and an adjacent slot for guiding the projection in the operative position of the pen lifter; said pen arm lifting wire being arranged relative to said guiding detent means to be generally in the line of motion of the pen arm over the chart when said wire is in a pen lifting position and in a direction generally parallel with the direction of the motion of the chart and adjacent to the edge thereof when in a retracted position to hold said edge in a record-making position.

5. In a recorder, the combination of a pen arm, a pen arm lifter operatively connectible with the pen arm at will to lift the pen, and damping means operatively connected with the lifter to increasingly retard the motion thereof with an increase in the velocity of the motion for limiting the velocity and for thus preventing the abrupt lifting of the pen arm.

6. In a recorder, the combination of a pen arm; a pen arm lifter connectible with the pen arm at will to lift the pen; a piston-and-cylinder damping means operatively connected with the lifter for limiting the velocity thereof, said piston being within and closely fitting the cylinder, said cylinder being closed at one end and containing a fluid in such end, and said piston being axially and rotatably movable relative to said cylinder; and detent means coacting with and operatively connectible with said piston upon rotation of said piston.

7. In combination, a pen lifter, means for biasing the pen lifter towards an operative pen-lifting position with the pen, detent means normally effective to hold the pen lifter inoperative, and damping means operatively connected with the pen lifter to increasingly oppose said biasing means with an increase in the velocity of the pen lifter when the pen lifter is lifting to then prevent abrupt motion thereof.

PAUL F. K. ERBGUTH.